UNITED STATES PATENT OFFICE.

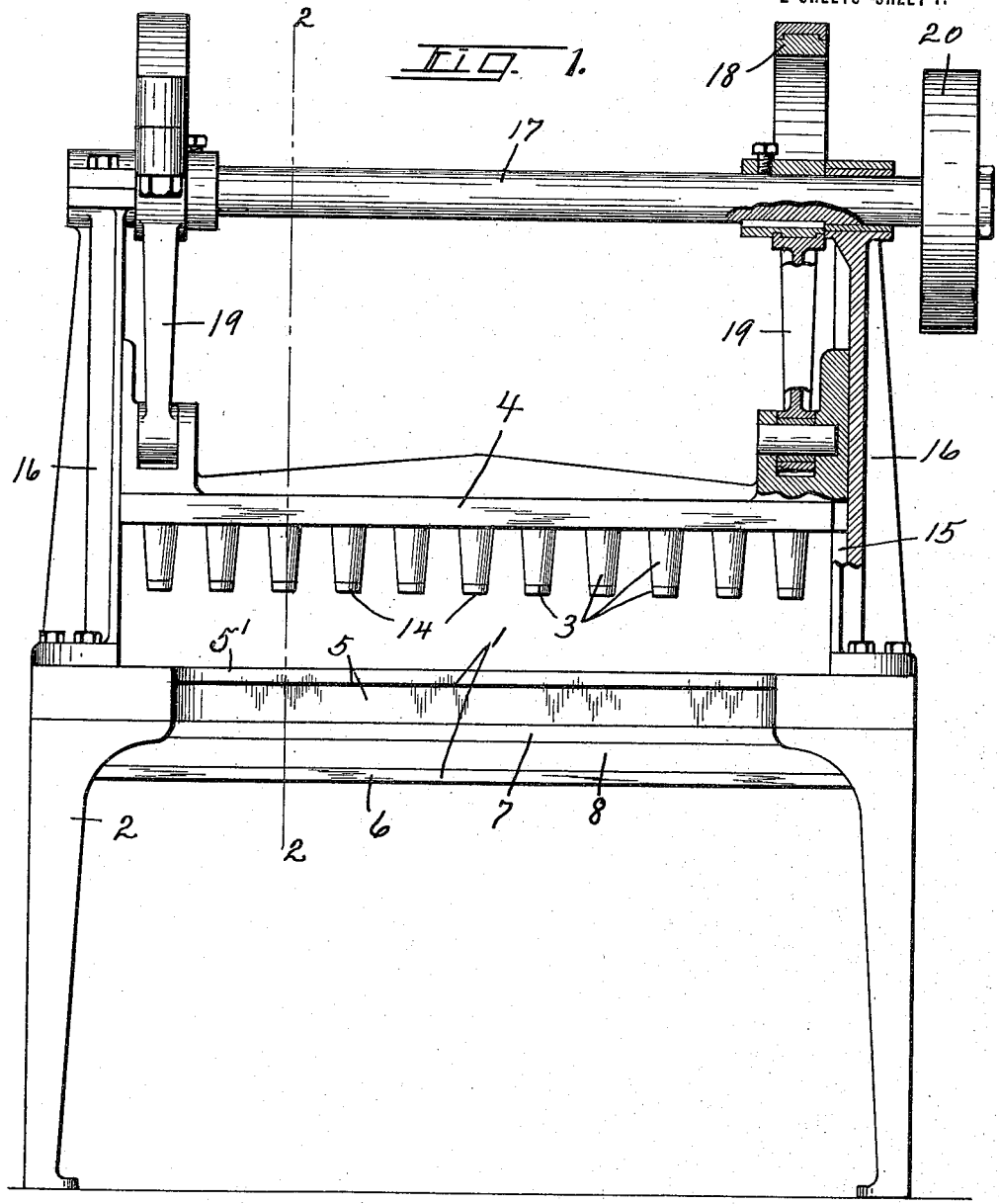

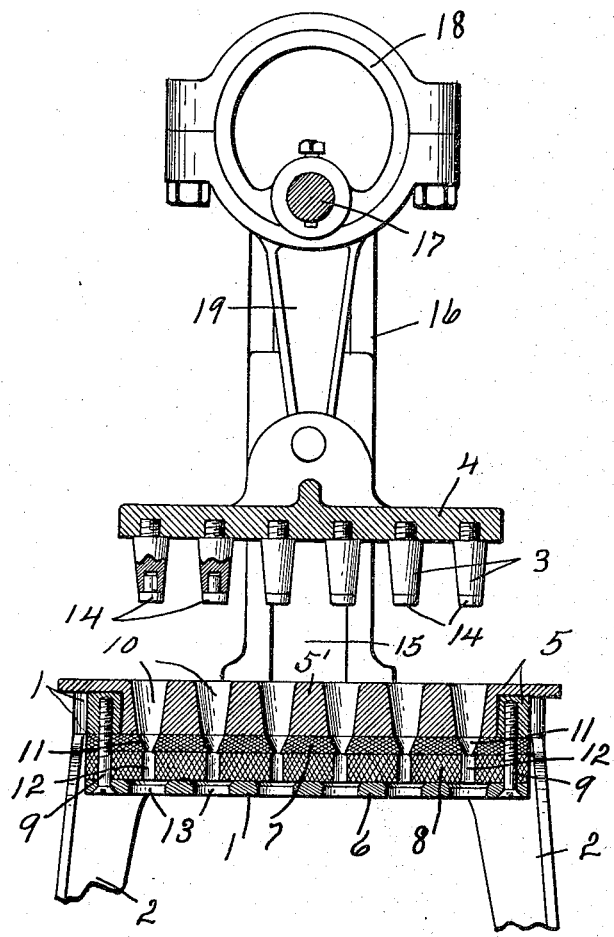

FRED F. HEDGES, OF UTICA, NEW YORK.

PEANUT-BLANCHER.

1,147,397.  Specification of Letters Patent.  Patented July 20, 1915.

Application filed November 21, 1913. Serial No. 802,226.

*To all whom it may concern:*

Be it known that I, FRED F. HEDGES, of Utica, in the county of Oneida, in the State of New York, have invented new and useful Improvements in Peanut-Blanchers, of which the following, taken in connection with the accompanying drawings, is a full, clear, and exact description.

This invention relates to certain improvements in peanut blanchers for stripping the husks or hulls from the nut meats.

The primary object is to provide mechanical means for expeditiously removing the husks from peanut meats after they are shelled without mutilating the meats. In other words, I have sought to provide simple means whereby the operators may spread the nut meats promiscuously over and upon the surface of a bed or table having a series of perforations therethrough of such construction that the nut meats will automatically seat themselves in the perforations endwise, said table having resilient members of soft rubber or equivalent material in which the apertures are reduced in size for stripping the husks from the meats as they are forced therethrough by suitable plungers.

Another object is to provide the plungers with resilient tips to prevent mutilation of the meats while they are being forced through the resilient strippers.

Other objects and uses will be brought out in the following description.

In the drawings—Figure 1 is a front elevation, partly in section, of a machine embodying the various features of my invention. Fig. 2 is a transverse vertical sectional view of the same machine taken on line 2—2, Fig. 1.

This machine comprises a horizontally disposed bed plate or table —1— mounted upon a suitable supporting frame —2— and provided with a series of vertical openings and resilient strippers through which the nut meats after being shelled are forced by a corresponding number of plungers —3— projecting from the lower side of a vertically reciprocating head —4—.

The bed or table —1— is preferably composed of upper and lower plates —5— and —6— of wood, metal or other rigid material and interposed stripping members —7— and —8— of resilient substance such as soft rubber, the plate —5— being mounted directly upon the top of the frame —2— while the lower plate —6— is secured to the under side of the plate —5— by screws —9— or equivalent fastening means, the stripping plates —7— and —8— being firmly held in place between the plates —5— and —6—. The upper plate —5— is provided with relatively large conical apertures —10— tapering downwardly and of sufficient size to receive peanut meats endwise therein when spread upon the upper surface of the table by hand or otherwise. The next adjacent lower plate —7— is preferably made of soft rubber or equivalent resilient material and is provided with conical apertures —11— also tapering downwardly and registering with the apertures —10— but of somewhat smaller size than the apertures —10— and average nut meats so that the friction produced by the resilient stripping members in forcing the nut meats therethrough will effectively strip the husks from the meats. This stripping of the husk is further facilitated and assured by the underlying stripping plate —8— which is also made of soft rubber or equivalent material and provided with a series of cylindrical apertures —12— registering with the apertures —10— and —11— and of somewhat smaller size than the nut meats so as to produce friction with the surface thereof as they are forced therethrough by the plungers —3— in a manner hereinafter described. The lower plate —6— is also provided with a series of apertures —13— registering with the apertures —12— but of somewhat greater diameter than the lower ends of the apertures —10— in the upper plate —5— so as to allow the husk meats to pass freely therethrough without liability of mutilation of the meats.

The plungers —3— are alined with and movable into and out of their respective apertures —10— and are normally held some distance above the upper surface of the plate —5— so as to allow the nut meats to be spread out by hand over the surface of the bed or table by which operation they gravitate into the apertures endwise after which the excess of nut meats are brushed off from the surface of the table and the plungers are then caused to descend to force the meats which may be in the apertures therethrough and through the stripping plates for removing the husks therefrom.

The plungers are of sufficient size and length to pass through the apertures in the upper plate —5— and their lower ends are provided with tips —14— of soft rubber or equivalent material to prevent mutilation of the meats while they are being forced through the strippers, the main bodies of the plungers above the tips being preferably made of wood or other comparatively inexpensive material and secured into the lower side of the head —4— so as to project downwardly some distance therefrom. The opposite ends of the head —4— are guided in ways —15— on the inner faces of upright brackets —16— which are secured to and rise from the opposite ends of the upper bed plate —5—.

The means for reciprocating the head —4— consists of a shaft —17— journaled in the upper ends of the brackets —16— and provided with a pair of eccentrics —18— which are connected by pitmen —19— to the opposite ends of the head —4— as shown more clearly in Fig. 1, said shaft being provided with a pulley —20— adapted to be connected by a belt to any available source of power not shown.

By interposing the soft rubber stripping members —7— and —8— between the rigid plates —5— and —6—, they are firmly held in place against vertical movement under the action of the plungers in forcing the nut meats therethrough and at the same time are free to yield laterally to permit the passage of the nut meats and to produce sufficient friction on the surfaces thereof to effectively strip the husks therefrom by reason of the fact that the apertures in the stripping members are of considerably less size than the meats.

At each operation of the plungers, the meats are forced through the stripping members and although those last operated upon may be held by friction in the stripping members, the succeeding operation of the plungers upon another series of meats which may have been placed in the openings —10— will force those which have been held by the stripping members downwardly and outwardly through the clearance openings —13—, while the husks which may accumulate in the openings —10— are similarly forced through the stripping members and thence outwardly through said clearance openings.

In some instances it may be desirable to first soften the skins or husks of the peanuts by immersing the latter in warm water or other suitable liquid to permit such skins to be more easily removed by the machine for this purpose the upper plate —5— may be provided with a removable section as —5'— resting loosely in the underlying plate and provided with the conical openings —10— thus permitting the plate —5'— with the peanuts therein to be immersed in the liquid until skins are softened and then replaced in the machine for removing the loosened skins from the meats in the manner described, it being understood that several of these plate —5'— may be provided to carry on the work progressively and expeditiously.

What I claim is:

1. A nut blancher comprising an apertured body of resilient substance and plungers having resilient tips movable into and out of the apertures to force the nuts therethrough.

2. A nut blancher comprising a body of resilient substance having an aperture therethrough and a plunger having a resilient tip movable into and out of the aperture for forcing the nuts therethrough.

3. In a nut-meat blancher, the combination of a non-resilient member having an aperture therethrough and an underlying resilient member also having an aperture alined with that in the first named member, a plunger for forcing the nut-meats through the aperture in the first named member and into the aperture of the resilient member, and means for preventing the movement of the plunger through the aperture in the resilient member.

4. A nut-meat blancher comprising a non-resilient member having a frusto-conical aperture therethrough and an underlying resilient member also having an aperture alined with that in the first named member for permitting the passage of nut meats therethrough and blanching the same, and a frusto-conical plunger movable in the first named aperture for forcing the nut meats therethrough.

5. In a nut-meat blancher, the combination of non-resilient members one above the other and separate resilient members interposed between the non-resilient members, said members being provided with registering apertures, and means movable only in the aperture of one of the non-resilient members for forcing the nut meats successively into the apertures of the resilient members and remaining non-resilient member.

In witness whereof I have hereunto set my hand this 12th day of November, 1913.

FRED F. HEDGES.

Witnesses:
JOSEPH J. BREWERTON,
CHAS. K. COOK.